United States Patent

Rohrmoser et al.

[11] Patent Number: 6,135,278
[45] Date of Patent: Oct. 24, 2000

[54] NAIL MAGAZINE

[75] Inventors: Günter Rohrmoser, Meiningen, Austria; Roland Hasler, Vaduz, Liechtenstein

[73] Assignee: Hilti Aktiengesellschaft, Schaan, Liechtenstein

[21] Appl. No.: 09/352,597

[22] Filed: Jul. 13, 1999

[30] Foreign Application Priority Data

Jul. 13, 1999 [DE] Germany .......................... 198 31 371

[51] Int. Cl.⁷ .................................................. B65D 85/24
[52] U.S. Cl. ........................................... 206/347; 411/443
[58] Field of Search .......................... 206/338, 343–347, 206/820; 411/442, 443

[56] References Cited

U.S. PATENT DOCUMENTS

| 3,944,067 | 3/1976 | Bakoledis ................................. 206/347 |
| 5,069,340 | 12/1991 | Ernst et al. ............................... 206/347 |
| 5,836,732 | 11/1998 | Gupta et al. .............................. 206/347 |
| 5,865,311 | 2/1999 | Hentges et al. .......................... 206/347 |
| 5,931,622 | 8/1999 | Gupta et al. .............................. 206/345 |

*Primary Examiner*—Jim Foster
*Attorney, Agent, or Firm*—Brown & Wood, LLP

[57] ABSTRACT

A nail magazine including a plurality of guide sleeves (2) for receiving each a nail-shaped fastening element (1) and arranged in a row next to each other in a spaced relationship with respect to each other, with each guide sleeve (2) including two end region ($E_1$, $E_2$) having a same cross-section, a central receiving bore (3) extending parallel to a longitudinal axis of the guide sleeve (2), and a through-opening (7) located between the two end regions ($E_1$, $E_2$) and extending transverse to the longitudinal axis of the guide sleeve (2) and transverse to a longitudinal extent of the nail magazine, and a plurality of pairs of spaced from each other connection webs (4, 5) for connecting adjacent sides of two adjacent guide sleeves (2), respectively, with at least one region of each connection web having a cross-shaped cross-sectional surface (8).

4 Claims, 1 Drawing Sheet

NAIL MAGAZINE

BACKGROUND OF THE INVENTION

1. Field of the Invention

The present invention relates to a nail magazine including a plurality of guide sleeves for receiving each a nail-shaped fastening element and arranged in a row next to each other in a spaced relationship with respect to each other, with each guide sleeve including two end region, a central receiving bore extending parallel to a longitudinal axis of the guide sleeve, and a through-opening located between the two end regions and extending transverse to the longitudinal axis of the guide sleeve and transverse to a longitudinal extent of the nail magazine,and a plurality of pairs of spaced from each other connection webs for connecting, respectively, adjacent sides of adjacent guide sleeve.

2. Description of the Prior Art

For attaching of thin-walled constructional elements to a constructional component, setting tools with which nail-shaped fastening elements, e.g., such as described in U.S. Pat. No. 5,443,345, are driven through the constructional element into the constructional component, are used. In order to insure that the constructional element lies on the constructional component backlash-free, on one hand, and to insure, on the other hand, damping of the drive-in energy applied to the fastening element, guide sleeves, which are elastically deformable in a direction parallel to the setting direction, are used together with the fastening elements. A plurality of guide sleeves, which are arranged in a row next to each other in a spaced relationship toward each other and are connected with each by connection webs projecting sidewise from the guide sleeves, form a nail magazine. Two connection webs, which are spaced from each other in a direction parallel to a guide sleeve longitudinal axis, are provided between each two adjacent guide sleeves. Each guide sleeve has a central receiving bore extending parallel to the guide sleeve longitudinal axis in which a nail-shaped fastening element is received. In its middle portion, each guide sleeve has a through-opening which extends transverse to the guide sleeve longitudinal axis and transverse to the longitudinal extent of the nail magazine.

In a conventional guide sleeve, the opposite end regions of the guide sleeve have different cross-sections. Therefore, only a hexagonal end region, which has a large surface, can contribute to guidance of the guide sleeve and of the fastening element in the guide tube of a setting tool. In the end region facing in a direction opposite to the setting direction, the guidance of the fastening element in the guide tube is effected by a fastening element head the cross-sectional surface of which substantially corresponds to the cross-sectional surface of the end region of the guide sleeve facing in the setting direction. Because the fastening element head can be in a direct contact with the inner wall of the guide tube, wear of the inner wall of the guide tube takes place. This adversely affects the guidance of the fastening element in the guide tube. A further drawback of the known guide sleeve consists in that the nail magazine, which is formed by the guide sleeves, has a reduced stiffness in a plane extending in a direction transverse to the guide sleeve longitudinal axis.

Accordingly, an object of the present invention is to provide a nail magazine that can be economically produced.

Another object of the present invention is to provide a nail magazine in which a good guidance of the fastening element in the guide tube of a setting tool in insured, and the wear of the inner wall of the guide tube is prevented.

A further object of the present invention is to provide a nail magazine in which the connection webs, on one hand, provide for high stiffness of the nail magazine and, on the other hand, are easily severed.

SUMMARY OF THE INVENTION

These and other objects of the present invention, which will become apparent hereinafter, are achieved by providing a nail magazine in which both end regions of each guide sleeve has the same cross-section, and at least one of the pair of connection webs has a cross-shaped cross-sectional surface.

The two end surfaces, because of their large and equal cross-sections, insure an adequate guidance of the fastening element in the guide tube of a setting tool. Further, because there is no contact between the fastening element head and the inner wall of the guide tube, the wear of the inner wall of the guide tube is prevented. The cross-shaped cross-sectional surface of the connection webs imparts a high stiffness to the nail magazine both in a plane extending parallel to the guide sleeve longitudinal axis and in a plane extending transverse to the longitudinal axis of the guide sleeve.

Because each two guide sleeves are connected with each other by two, spaced from each other a direction parallel to the guide sleeve longitudinal axis connection webs, the nail magazine has a high stiffness in a plane extending parallel to the guide sleeve longitudinal axis, despite a short length of the connection webs in that direction.

Advantageously, the extent of the cross-shaped cross-sectional surface of the connection web corresponds to 0.1 to 0.3 times of the length of the entire guide sleeve in a direction parallel to the guide sleeve longitudinal axis.

The length of the connection webs in a direction transverse to the longitudinal axis of the guide sleeve favorably influences the degree of stiffness of the nail magazine in a plane extending transverse to the guide sleeve longitudinal axis. Preferably the extent of the cross-sectional surface of the connection webs in a direction transverse to the guide sleeve longitudinal axis corresponds to 0.3÷1.0 times of the extent of the central region of the guide sleeve in that direction.

In order to impart a high stiffness to the entire guide sleeve, preferable, a middle web, which extends parallel to sleeve longitudinal axis, is provided between the spaced connection webs which connect two adjacent guide sleeves.

BRIEF DESCRIPTION OF THE DRAWINGS

The features and objects of the present invention will become more apparent, and the invention itself will be best understood from the following detailed description of the preferred embodiment when read with reference to the accompanying drawings, wherein.

DETAILED DESCRIPTION OF THE PREFERRED EMBODIMENT

Figure 1:
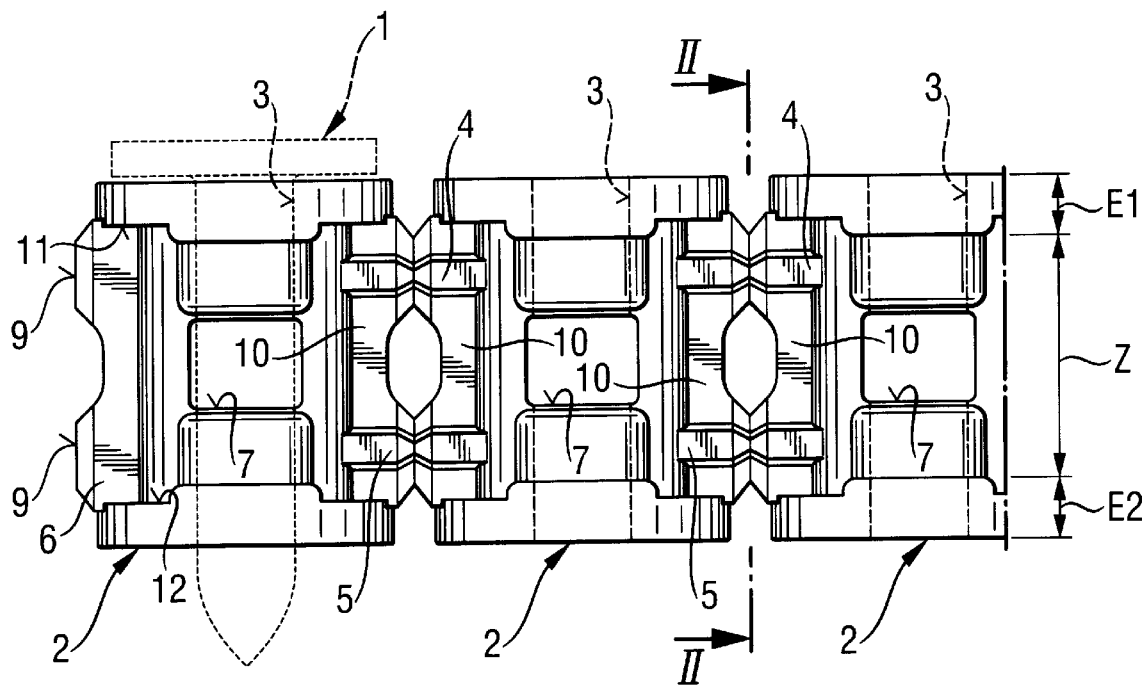
FIG. 1 shows schematically a side view of a portion of a nail magazine according to the present invention.
Figure 2:
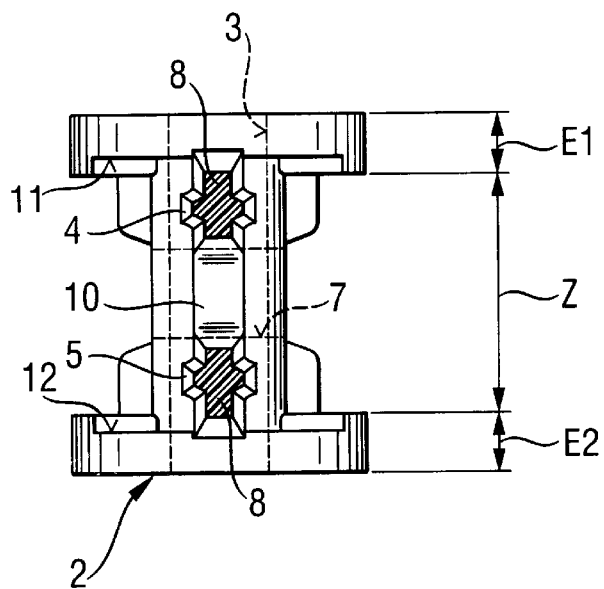
FIG. 2 shows a cross-sectional view of the nail magazine along line II—II in FIG. 1.

A nail magazine according to the present invention, which is shown in FIGS. 1–2, has a plurality of connected with each other, guide sleeves 2 arranged in a row next to each other in a spaced relationship to each other. Each guide sleeve 2 has a central opening 3, which extends parallel to a longitudinal axis of the guide sleeve 2, for receiving a fastening element 1 shown in FIG. 1 with dash lines. Each guide sleeve 2 has two end regions $E_1$, $E_2$ having the same cross-section and a central region (Z) located between the two end regions ($E_1$, $E_2$). Between the two end regions $E_1$, $E_2$, the guide sleeve 2 has a through-opening 7, which extends transverse to the longitudinal axis of the guide sleeve 2 and transverse to the longitudinal extent of the nail magazine. The through-opening 7 intersects the receiving bore 3.

Each two adjacent guide sleeves 2 are connected by two connection webs 4, 5 projecting radially from the guide sleeves 2. The two connection webs 4, 5 are spaced from each other in a direction parallel to the longitudinal axis of the guide sleeve 2. A middle web (10) is provided between each two spaced connection webs (4, 5). The connection webs 4,5 of the inventive nail magazine have, in a region between two adjacent guide sleeves 2, a cross-shaped cross-sectional surface 8. The extent of the cross-sectional surface 8 in a direction transverse to the guide sleeve longitudinal axis corresponds substantially to 0.25 times of the extent of an end region $E_1$, $E_2$ of the guide sleeve 2 in the same direction. The extent of the cross-sectional surface 8 in a direction parallel to the guide sleeve longitudinal axis corresponds substantially to 0.2 times of the length of the entire guide sleeve 2.

The connection webs 6 of the guide sleeves 2, which are provided in the end region of the nail magazine, have a rectangular cross-sectional surface 9 with a region extending parallel to the guide sleeve longitudinal axis and having substantially a length corresponding to 0.2 times of the length of the entire guide sleeve 2.

The two end regions $E_1$, $E_2$ have two adjacent to each other guide surfaces 11, 12 which provide for axial guidance of the guide sleeves 2 or of the nail magazine in a correspondingly formed guide rail (not shown).

Though the present invention was shown and described with references to the preferred embodiments, various modifications thereof will be apparent to those skilled in the ar and, therefore, it is not intended that the invention be limited to the disclosed embodiment or details thereof, and departure can be made therefrom within the spirit and scope of the appended claims.

What is claimed is:

1. A nail magazine, comprising a plurality of guide sleeves (2) for receiving each a nail-shaped fastening element (1) and arranged in a row next to each other in a spaced relationship with respect to each other, each guide sleeve (2) including two end regions ($E_1$, $E_2$) having a same cross-section, a central receiving bore (3) extending parallel to a longitudinal axis of the guide sleeve (2), and a through-opening (7) located between the two end regions ($E_1$, $E_2$) and extending transverse to the longitudinal axis of the guide sleeve (2) and transverse to a longitudinal extent of the nail magazine; and a plurality of pairs of spaced from each other connection webs (4, 5), each pair of connection webs connecting adjacent sides of two adjacent guide sleeves (2), and each connection web (4,5) having at least one region with a cross-shaped cross-sectional surface (8).

2. A nail magazine according to claim 1, wherein the cross-sectional surface (8) has a longitudinal extent, in a direction parallel to the longitudinal axis of the guide sleeve (2), corresponding to 0.1 to 0.3 times of a length of the entire guide sleeve (2).

3. A nail magazine according to claim 1, wherein the cross-sectional surface (8) has a length, in a direction transverse to the longitudinal axis of the guide sleeve (2), corresponding to 0.3 to 1.0 times of an extent of a central region (Z) of the guide sleeve (2) in the direction transverse to the longitudinal axis of the guide sleeve (2).

4. A nail magazine according to claim 1, further comprising a middle web (10) extending parallel to the longitudinal axis of the guide sleeve (2) and between each two spaced connection webs (4, 5).

* * * * *